United States Patent

Ackerman et al.

[15] 3,675,239

[45] July 4, 1972

[54] UNLIMITED ROLL KEYBOARD CIRCUIT

[72] Inventors: Howard T. Ackerman, Kettering; Clarence W. Kessler, Dayton, both of Ohio

[73] Assignee: The National Cash Register Company, Dayton, Ohio

[22] Filed: Sept. 14, 1970

[21] Appl. No.: 71,972

[52] U.S. Cl.......................340/365, 340/146.1 AB, 340/348, 328/41

[51] Int. Cl...........................................................G08c 15/12

[58] Field of Search........................340/365, 348, 146.1 AB; 178/17 C

[56] References Cited

UNITED STATES PATENTS

| | | | |
|---|---|---|---|
| 3,308,918 | 3/1967 | James | 178/17 C |
| 3,454,717 | 7/1969 | Peters | 178/17.5 |
| 3,568,183 | 3/1971 | Snell | 340/365 |

*Primary Examiner*—Thomas B. Habecker
*Attorney*—Louis A. Kline, John J. Callahan and John P. Tarlano

[57] ABSTRACT

The present invention relates to a full-roll keyboard circuit which provides unlimited roll of the keys within the full-roll keyboard circuit. The keys are connected individually to corresponding cells of a first shift register. Data is entered parallelly during a first strobe pulse from the depressed keys into the first shift register. Thereafter during a first 16 bit cycle, bits are shifted serially out of the first shift register into a compare circuit and also into a second shift register. A 4 bit polynomial counter counts the codes of the 16 keys during the 16 bit cycle. The bits in the first shift register are shifted into the compare circuit throughout the first 16 bit cycle to cause loading of the corresponding binary information from the polynomial counter into a key code collector.

New bits are then read from the keyboard into the first shift register during a second strobe pulse. During a second 16 bit cycle, after the second strobe pulse, the bits in the first shift register are shifted into the second shift register and to the compare circuit. Bits from the first shift register and bits from the second shift register are individually compared during the second 16 bit cycle by the compare circuit. If a one bit simultaneously comes from the first shift register and a one bit comes from the second shift register during the second 16 bit cycle, this indicates that a certain key within the keyboard was depressed both during the first strobe pulse and also during the second strobe pulse. The binary information from the polynomial counter for that key will not be loaded again into the key code collector at this time.

7 Claims, 9 Drawing Figures

INVENTORS
HOWARD T. ACKERMAN &
CLARENCE W. KESSLER

BY Louis A. Kline
John J. Callahan
John P. Tarlano

THEIR ATTORNEYS

INVENTORS
HOWARD T. ACKERMAN &
CLARENCE W. KESSLER
BY Louis A. Kline
John J. Callahan
John P. Tarlano
THEIR ATTORNEYS INVENTORS
HOWARD T. ACKERMAN &
CLARENCE W. KESSLER
BY Louis A. Kline
John J. Callahan
John P. Tarlano
THEIR ATTORNEYS INVENTORS
HOWARD T. ACKERMAN &
CLARENCE W. KESSLER
BY Louis A Kline
John J. Callahan
John P. Tarlano
THEIR ATTORNEYS INVENTORS
HOWARD T. ACKERMAN &
CLARENCE W. KESSLER
BY Louis A. Kline
John J. Callahan
John P. Tarlano
THEIR ATTORNEYS INVENTORS
HOWARD T. ACKERMAN &
CLARENCE W. KESSLER
BY Louis A. Kline
John J. Callahan
John P. Tarlano
THEIR ATTORNEYS INVENTORS
HOWARD T. ACKERMAN &
CLARENCE W. KESSLER
BY Louis A. Kline
John J. Callahan
John P. Tarlano
THEIR ATTORNEYS INVENTORS
HOWARD T. ACKERMAN &
CLARENCE W. KESSLER
BY Boris A. Klein
John J. Callahan
John P. Tarlano
THEIR ATTORNEYS INVENTORS
HOWARD T. ACKERMAN &
CLARENCE W. KESSLER
BY Louis A. Kline
John J. Callahan
John P. Tarlano
THEIR ATTORNEYS

UNLIMITED ROLL KEYBOARD CIRCUIT

BACKGROUND OF THE INVENTION

The prior art discloses a keyboard circuit having a two key roll capability. If a first key is depressed, a control flip-flop is set which prevents the reading of a second key which might be depressed during the continued depression of the first key. Upon release of the first key, the second key is then read. However, this prior art keyboard circuit does not have a full keyboard roll capability. That is, no key of the keyboard can be read during the continued depression of any other key of the keyboard.

In the full-roll keyboard circuit of the present invention, the depression of a first key is read during a bit cycle time subsequent to a strobe pulse. This first key is not read after that cycle time if the first key depressed remains during a next strobe pulse. If at the second strobe pulse a second key is depressed, it will be read during that second bit cycle time but the first key will not be read again during that second bit cycle time. If at a third strobe pulse the first two keys remain depressed, they will not be read during the subsequent cycle time. If a third key is depressed at the third strobe pulse, it will be read during the subsequent cycle time. Thus the full-roll keyboard circuit of the present invention allows each key to be read only during the subsequent cycle time after depression and allows a new key depression to be read during a subsequent bit cycle time after its depression even though the first key remains depressed during the latter bit cycle time.

This new full-roll keyboard circuit allows for unlimited roll due to a first shift register which is parallelly addressed by the keys of a keyboard in combination with a second shift register which is serially addressed by the output of the first shift register and a compare logic circuit which is serially addressed by the output of both the first shift register and the second shift register.

The information from the full-roll keyboard circuit is parallelly shifted into the first shift register during a strobe pulse. Then during a first 16 bit cycle after the strobe pulse the information within the first shift register is shifted serially both into the compare circuit and into the second shift register. During a second strobe pulse new information is parallelly read into during the first shift register. The old information in the second shift register and the new information in the first shift register are compared in the compare logic circuit. During the second cycle after the second strobe, the information within the first shift register and within the second shift register is compared, to determine if any keys in the keyboard were held down during more than one strobe and to determine if any new keys had been depressed at the last strobe.

SUMMARY OF THE INVENTION

A full-roll keyboard circuit for controlling the flow of a key code of any newly depressed key to a key code collector during the continued depression of any other key, comprising: keyboard switch means having a plurality of key means therein for sending out a binary bit from each depressed key means during each timing cycle, an array of bistable means, the keyboard switch means being connected to a first section of the array of bistable means for allowing the inputting of a binary bit from each depressed key means into the first section of the array, timing means for transferring the binary bits from the first section of the array of bistable means into a second section of the array of bistable means during a timing cycle, compare means for comparing the binary bits serially coming out of the first section of the array of bistable means with the binary bits serially coming out of the second section of the array of bistable means, during any timing cycle, the compare means allowing a key code to flow to the key code collector when a binary bit comes out of the first section of the array and a different binary bit comes out of the second section of the array during the serial exiting of binary bits from the first and second section of the array of bistable means during each timing cycle.

An object of the present invention is to provide a full-roll keyboard circuit.

Another object of the present invention is to provide a full-roll keyboard circuit for reading a key depression of any key of the full-roll keyboard only once.

A further object of the present invention is to provide a full-roll keyboard encoder circuit.

Another object of the present invention is to provide a full-roll keyboard encoder circuit which eliminates the reading of flutter of the reed switches of the keys within the full-roll keyboard encoder circuit.

DESCRIPTION OF THE PREFERRED EMBODIMENT

Figure 1A:
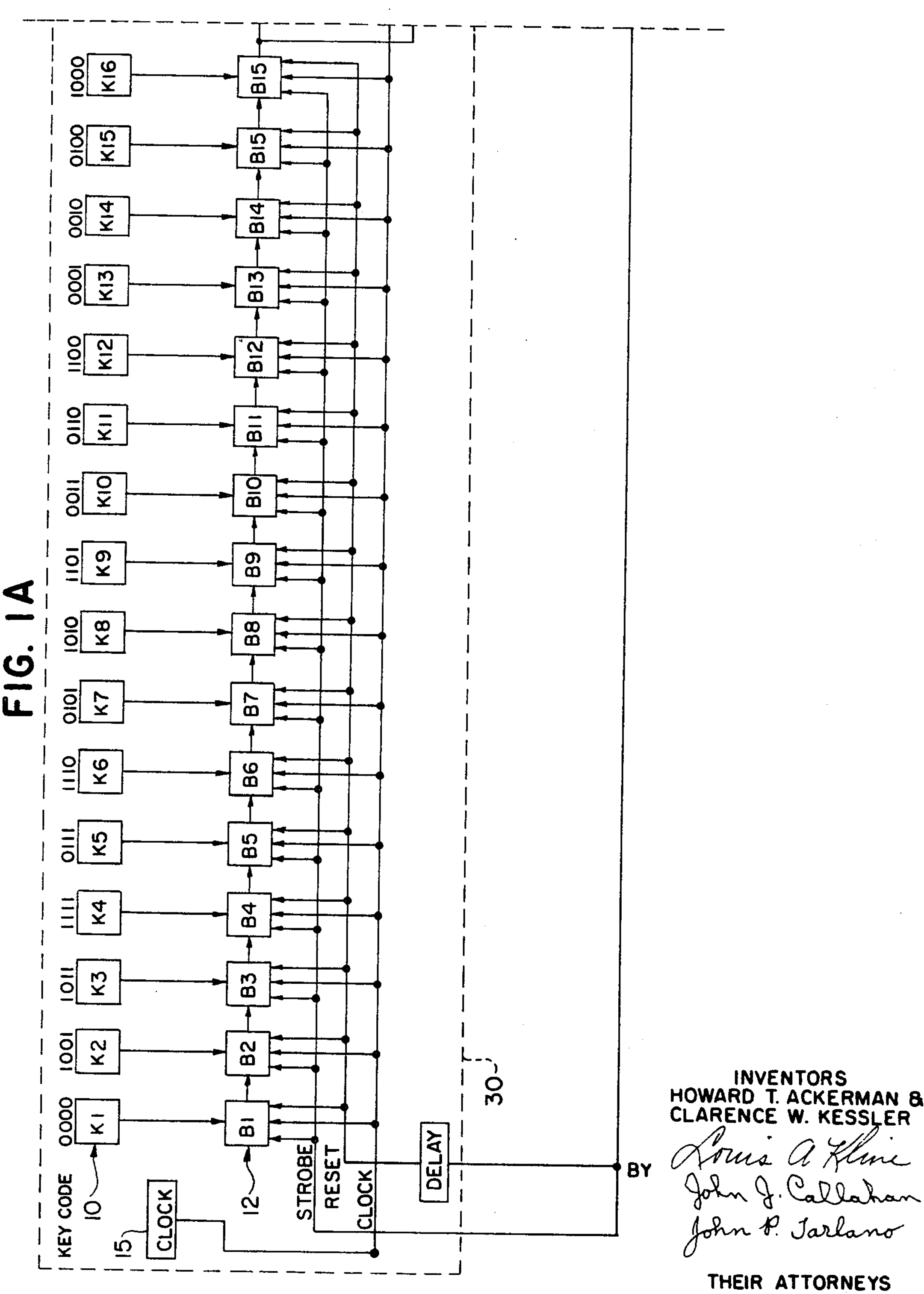
FIGS. 1A and 1B form a diagram of the full-roll keyboard encoder circuit including the full-roll keyboard circuit of the present invention.
Figure 1B:
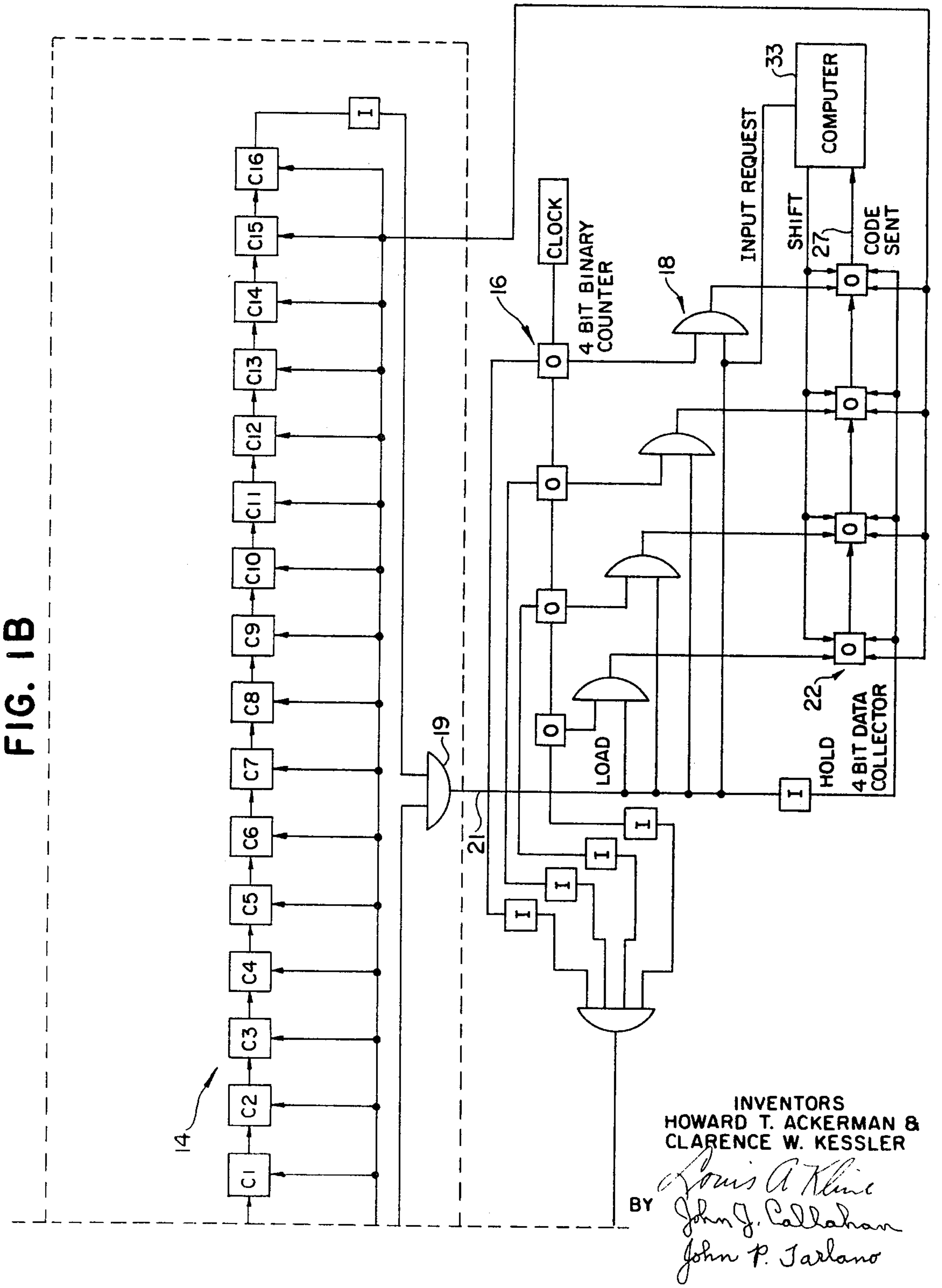

FIGS. 1A and 1B show the full-roll keyboard circuit 30 of the present invention. Keyboard 10 within the full-roll keyboard circuit 30 has 16 keys $K_1$ to $K_{16}$ therein. If a key $K_1$ is depressed during clock times 1 to 16 of clock 15, a one bit is strobed into the shift register cell $B_1$ of 16 bit shift register 12, such as a 4-phase shift register, at clock time 17 of FIG. 2A. The clock time 17 is also the second strobe time. The one bit within shift register stage $B_1$ of the 4-phase 16 bit shift register 12 is shifted forward through stages $B_2$ to $B_{16}$ during clock times 17 to 32 of FIGS. 2A and 2B, into the shift register cell $C_1$ of 16 bit shift register 14 at clock time 33. After these 16 clock times, the keyboard 10 is strobed a third time at clock time 33 and a one bit depressed key $K_1$ of keyboard 10 is again transferred in parallel into the shift register cell $B_1$ of the first 4-phase shift register 12. During each 16 clock times, the data that is stored in the first shift register 12 is serially shifted out of the first shift register 12 into the second shift register 14. The one bit from cell $B_{16}$ and inverted zero bit from cell $C_{16}$ is inputted into "and" gate 19 at clock time 33. The zero bit of cell $C_{16}$ is inverted before it goes to "and" gate 19. A resulting one bit from "and" gate 19 is called a "load."

The binary bits are shifted out of cells $B_{16}$ and $C_{16}$. The binary bit of shift register cell $B_{16}$ and the inverted binary bit out of cell $C_{16}$ are compared by the "and" gate 19 at every clock time. A comparison at the clock times 17, 33, 49 and 65, etc. is used to determine whether the key $K_1$ was depressed during clock times 1, 17, 33 and 49, etc. and whether it remained down during clock times 17, 33, 49 and 65, etc.

The "one" bit coming from cell $B_{16}$ and a "zero" bit coming from cell $C_{16}$ at clock time 33 indicates that key $K_1$ was depressed some time before clock time 17. A load signal is sent from compare circuit 19 to code transfer circuit 18 when the 1 comes from cell $B_{16}$ and the zero comes from cell $C_{16}$ at clock time 33. At this time the code transfer circuit 18 allows the polynomial counter 16 to pass the key $K_1$ code count of 0000 to the key code collector 22. The key code collector 22 is thus encoded with the key code for depressed key $K_1$ at clock time 33 of FIG. 2B. The polynomial counter 16 generates key codes at the clock times. The key code for key $K_1$ occurs at clock times 1, 17, 33, 49, 65, etc. A load signal at clock time 33 allows the key code for key $K_1$ to pass to key code collector 22 at clock time 33. The computer 33 can then shift the key code out of the key code collector 22 at a shift signal during the next four clock times.

The shift register cell $C_1$ stores, at clock time 33, the one bit which also went out of the shift register cell $B_{16}$ to "and" gate 19 at clock time 33. The one bit from $B_{16}$ is compared with the inverted one bit from $C_{16}$ and is sent to "and" gate 19 at clock time 49. A load signal is therefore not sent out from "and" gate 19 at clock time 49. The key code for key $K_1$ is not again transferred to the key code collector 22 at clock time 49 even though key $K_1$ is still depressed at the strobe time at clock time 33.

Key $K_1$ remained depressed at the strobe at clock time 33. At clock time 49, one bit came out of cell $C_{16}$, which one bit went into cell $B_1$ at clock time 17. At clock time 49 the one bit comes out of cell $B_{16}$, which went into cell $B_1$ at clock time 33. The one bit of $B_{16}$ and the inverted one bit of $C_{16}$ are "anded" by "and" gate 19 at clock time 49. Due to a one bit and a zero bit into "and" gate 19 at clock time 49, no load signal comes out of "and" gate 19 at clock time 49. Thus the full-roll keyboard circuit 30 reads the continued key depression of key $K_1$ only at clock time 33.

When a key depression has been detected, as a result of a one bit coming out of first shift register 12 and a zero bit coming out of shift register 14 during a timing cycle, a signal called load is activated. This activation causes the count within the polynomial counter 16 to be transferred into the key code collector 22. Following this transfer, the data is then retained in the key code collector 22 for subsequent transfer to the computer 33, when the computer sends a shift signal. The polynomial counter 16 is a standard four bit binary counter.

The full-roll keyboard circuit 30 has an unlimited roll capability. A roll is defined as the ability to depress and maintain a key in a down position and the ability to depress other keys without releasing the previously depressed key, to transfer a key code for only the second depressed key. In other words, all the 16 keys can be depressed one at a time and held in a down position without release, and a code for each key would be transferred to the computer 33 only one time for each key depression.

Figure 2A:
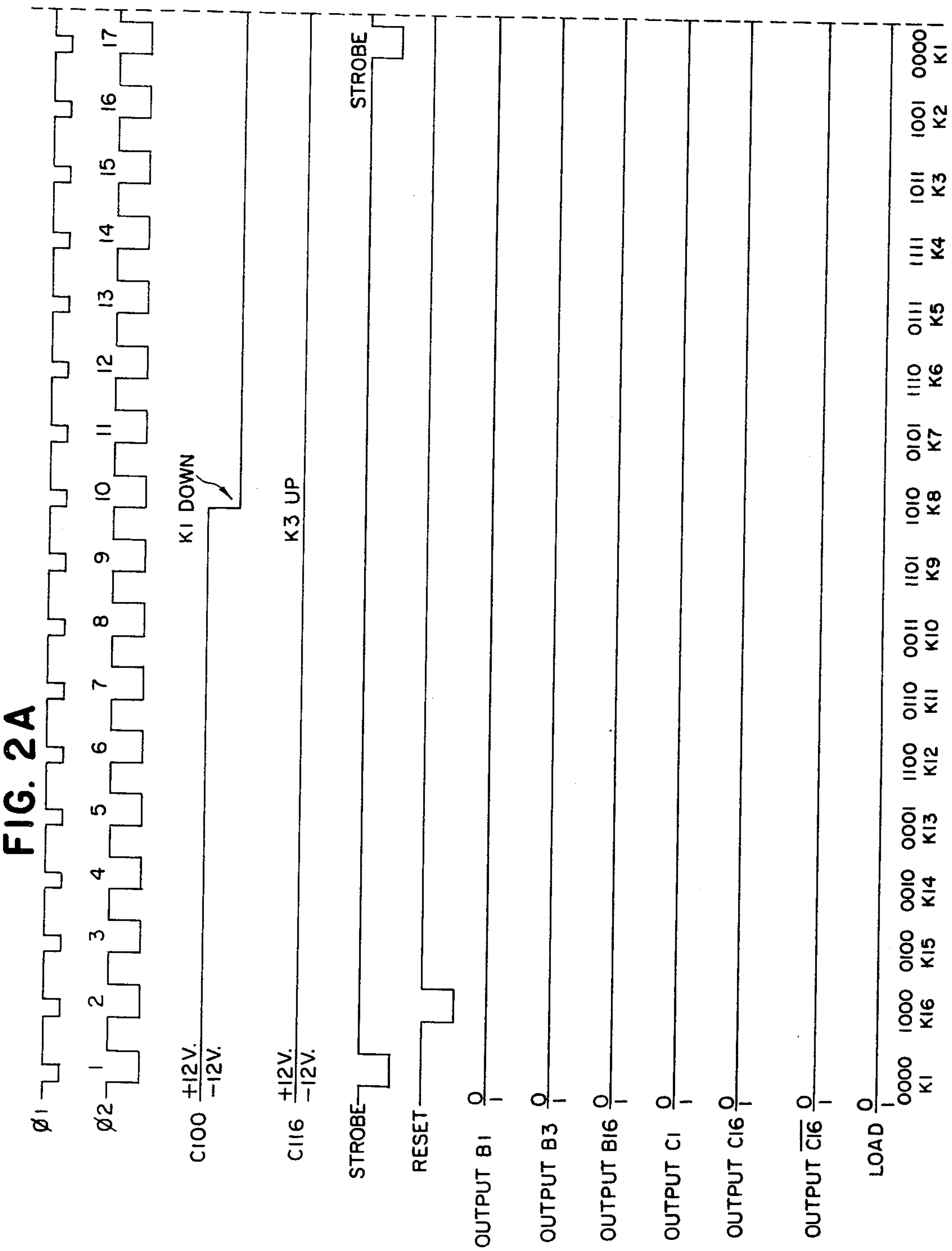
FIGS. 2A, 2B, 2C, and 2D form a timing diagram for the operation of the full-roll keyboard encoder circuit of FIGS. 1A and 1B.

As shown in FIG. 2A, key $K_1$, which represents a clear key, was being depressed at strobe pulse at clock time 17. A logic one bit was transferred to cell $B_1$ of shift register 12 at the second strobe pulse at clock time 17. The corresponding cell $C_1$ of shift register 14 was in a logic zero state at clock time 17. During the next 16 clock times, the contents of cell $B_1$ are shifted from cell $B_1$ through cell $B_{16}$ down to "and" gate 19. The zero bit in cell $C_1$ is likewise shifted from cell $C_1$ through cell $C_{16}$ to the "and" gate 19. During these clock times, the data coming out of cell $B_{16}$ of shift register 12 is also transferred into cell $C_1$ of register 14. In the "and" gate 19, a one bit coming from cell $B_{16}$ of register 12 and a zero bit coming from cell $C_{16}$ of shift register 14 at clock time 33 signifies the depression of key $K_1$.

Since the key $K_1$ is held in the down position, at the third strobe pulse at clock time 33, a one bit is again transferred to cell $B_1$. The state of the corresponding cell $C_1$ in the second shift register 14 at clock time 33 is at a logic one bit state. During the 16 bit times after the third strobe pulse, the contents of $B_1$ are again transferred down serially from shift register 12 into the compare circuit 19 and into the second shift register 14. The contents of the second shift register 14 are also transferred down to the compare circuit during the 16 bit times after the third strobe. Under these conditions the one bit from cell $B_{16}$ of shift register 12 and the inverted one bit from cell $C_{16}$ of shift register 14 are "anded." Therefore a load signal is not sent out from "and" gate 19 at clock time 49. This condition represents a continued depression of key $K_1$ at clock time 33.

Maintaining key $K_1$ in the down position, the key $K_3$ was then depressed before the fourth strobe pulse, at clock time 49. The condition of keys $K_1$ and $K_3$ are again transferred into register 12 during the fourth strobe pulse, at clock time 49. The contents of shift register 12 are serially shifted and compared against the contents of shift register 14 after the fourth strobe pulse. At the 63rd clock time, a one bit, originating at cell $B_3$, is shifted out of cell $B_{16}$, and is compared against the zero bit that was in cell $C_3$ at the fourth strobe pulse, at clock time 49. The resultant logic one bit from cell $B_{16}$ and the resultant logic zero from cell $C_{16}$ at the 63rd time represent a new key depression of key $K_3$. The key code 1011 for key $K_3$ therefore passes from the four bit polynomial counter 16 to the four bit key code collector 22. The key code can then be transferred to the computer 33 at a shift signal.

At clock time 65, the one bit that was stored in cell $B_1$ from key $K_1$, at clock time 49, is shifted out of cell $B_{16}$ and the one bit which was in cell $C_1$, at clock time 49, is shifted out of cell $C_{16}$ of register 14. The one bit from register 12 and the inverted zero bit from the register 14 at clock time 65 indicate a continued depression of key $K_1$ at clock time 49. The key code for key $K_1$ is therefore not passed from polynomial counter 16 to the key code collector 22 at clock time 65.

Another key can be depressed and its code transferred to the data collector 22 for transfer to the computer 33 during the continued depression of keys $K_1$ and $K_3$. Only the key code for this newly depressed key will be encoded. The depressing of one key without release of at least two other depressed keys, and the encoding of the key code of this newly depressed key only once, is a feature called full-rod capability. A circuit allowing such capability is called a full-roll keyboard encoder circuit.

Figure 3:
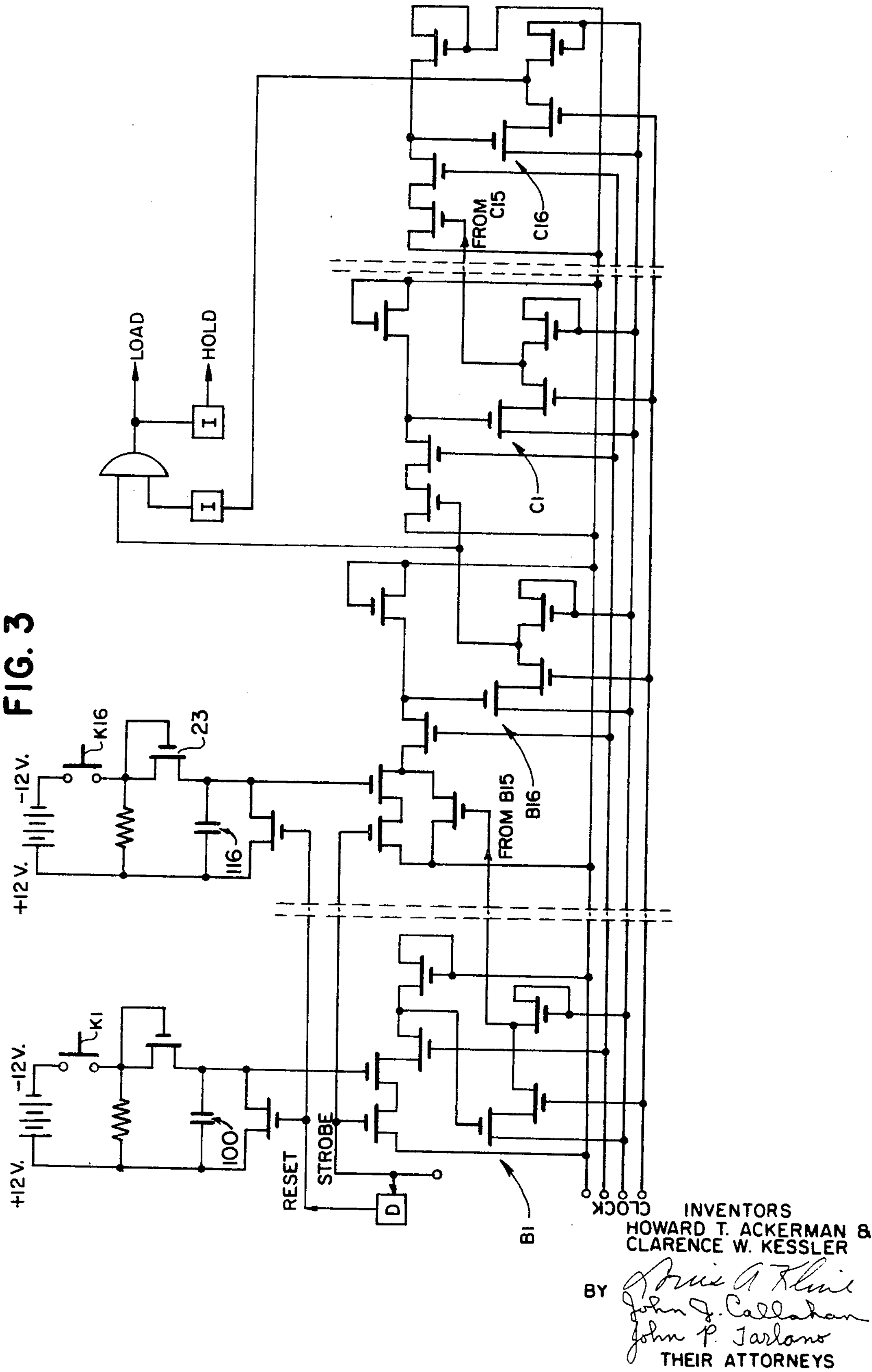
FIG. 3 is the schematic diagram of the full-roll keyboard circuit of the present invention.

As shown in FIG. 3, the depression of a key such as key $K_{16}$ results in closure of a reed switch 11. This allows a capacitance 116 to charge to the minus 12 volts. The initial closure of a reed switch 11 is normally accompanied by what is known as reed switch contact bounce. Contact bounce is exemplified by middle closing, and is due to impact. The contacts will oscillate open and closed for a short period of time. The transistor 23 acts as a diode and allows capacitor 116 to charge to the minus 12 volts. The charge is retained in capacitor 116 during contact bounce. The charge then on capacitor 116 acts as an input to shift register cell $B_{16}$. The charge on capacitor 116 is held until after the shift register cell $B_{16}$ is strobed. At the strobe time, the charge on capacitor 116 is logically "ored" with the output of the preceding shift register cell $B_{15}$ by transistors 42 and 44 and logically "anded" with the strobe by transistor 46. If capacitor 116 has been charged to a $-12$ volts, or is at a logic one, the shift register cell $B_{16}$ has a one bit placed therein. If capacitor 26 is not charged to the $-12$ volts, but is at a potential of $+12$ volts, the shift register cell has a zero bit placed therein.

After the strobe pulse, the shift register cells in register 12 are connected in series. The reset pulse discharges the capacitor 116 at the first clock time after the strobe pulse. The key $K_{16}$ is connected to the shift register cell $B_{16}$ only at the strobe pulse.

At each clock time, the binary bit in each shift register cell is shifted to the next. The input as shown on FIG. 3 from the preceding cell in shift register 12 is inputted to the next cell. The data is shifted one bit at a time toward cell $B_{16}$. The strobe occurs every 16 bit times. Therefore, the binary state of capacitors 100 to 116 are read every 16 bit times. Immediately following each strobe pulse, at the next bit time, any charged capacitors 100 to 116 are discharged by means of the reset pulse. The reset pulse will discharge any charged capacitor 100 to 116 back to $+12$ volts.

At the strobe pulse, a binary one bit, as a result of $-12$ volts on capacitor 116, causes element $B_{16}$ to change to a logic one state. At the next bit time after strobe, cell $C_1$ assumes the logic one state of $B_{16}$. At the second bit time after strobe, logic cell $C_2$ assumes the logic one state of the cell $C_1$. This continues in serial through $C_{16}$ for 16 clock times.

FIG. 3 represents a schematic of the shift register logic associated with the keyboard 10. Two shift registers shown on the schematic are cells $B_1$ and $B_{16}$ of first 16 bit shift register 12 and cells $C_1$ and $C_{16}$ of second 16 bit shift register 14. The reed switches 11 for keys $K_1$ and $K_{16}$ of keyboard 10 are shown. The compare means which is an "and" gate 19 is shown. The four phase shift register 12 and the four phase shift register 14 each consists of 16 stages. Each of the 16 cells of the first shift register 12 has a 1 to 1 correspondence to the 16 keys on keyboard 10. The shift register 12 is strobed after every 16 bit times. The binary state of the keyboard input, for example, key $K_1$, goes into the first shift register $B_1$ at the strobe pulse. The strobe and the contents of the logic level of $K_1$ are logically "anded" together to set the cell $B_1$ to the appropriate binary state. Following the strobe pulse, the binary state of shift register cell $B_1$ is serially shifted through the shift register 12 from cell $B_1$ toward cell $B_{16}$.

The shift register 14 is a serial shift register containing 16 cells and is used in conjunction with shift register 12 to determine whether a key in keyboard 10 has been depressed, whether a key is being held down, whether a new key is depressed while another key is held down and whether a key is depressed while two keys are held down. This is accomplished by comparing the binary bits coming from shift register 12 with the binary bits coming from shift register 14, in "and" gate 19. The shift registers 12 and 14 are logically oriented such that there is a one to one comparison, or one to one relationship between the cells of shift register 14 and shift register 12. That is, cell $C_1$ is associated with cell $B_1$, cell $C_2$ is associated with cell $B_2$, etc. The resultant output from "and" gate 19 is placed on output line 21.

Figure 4A:
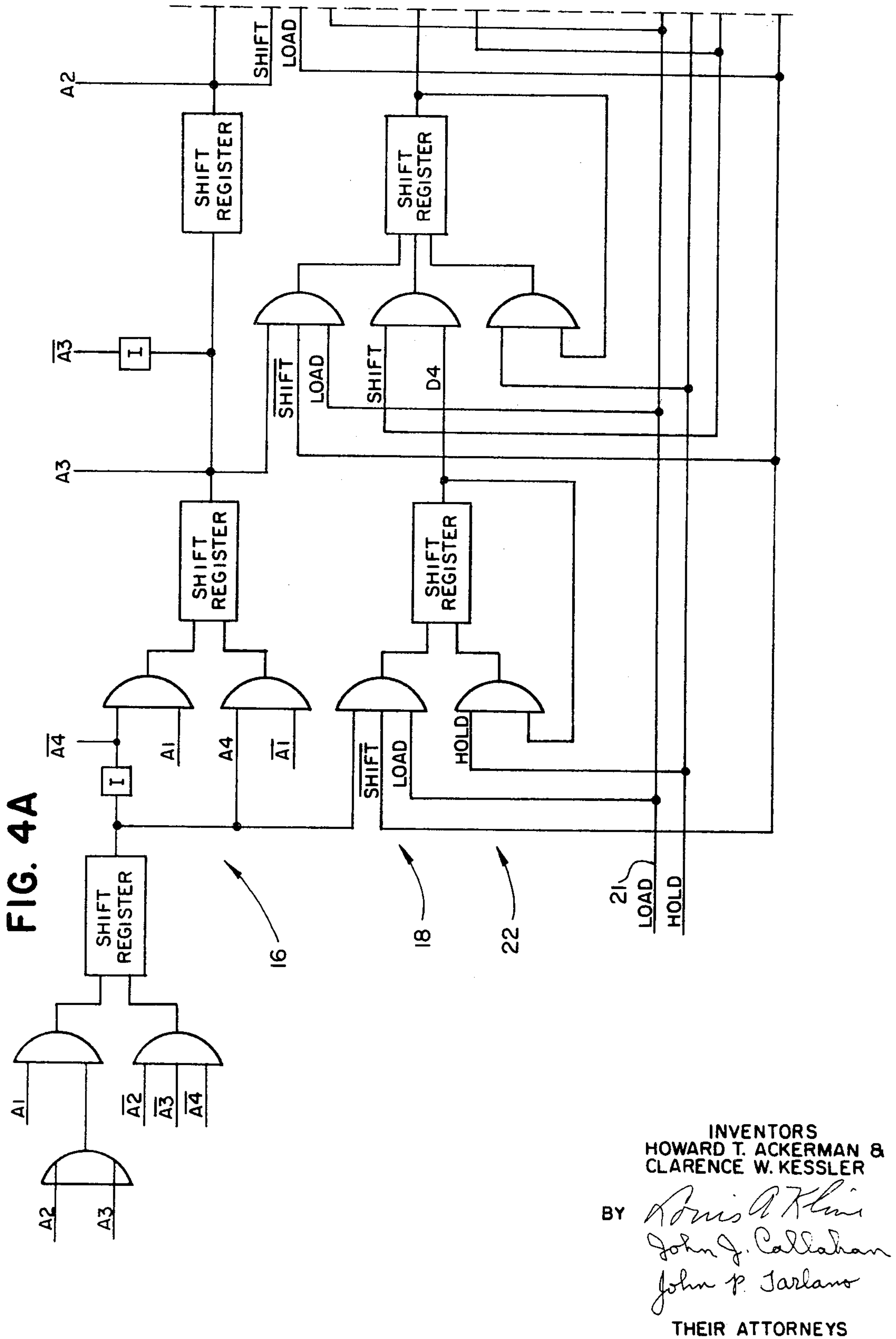
FIGS. 4A and 4B form a detailed schematic diagram of the key code encoder used in the full-roll keyboard encoder circuit of the present invention.
Figure 4B:
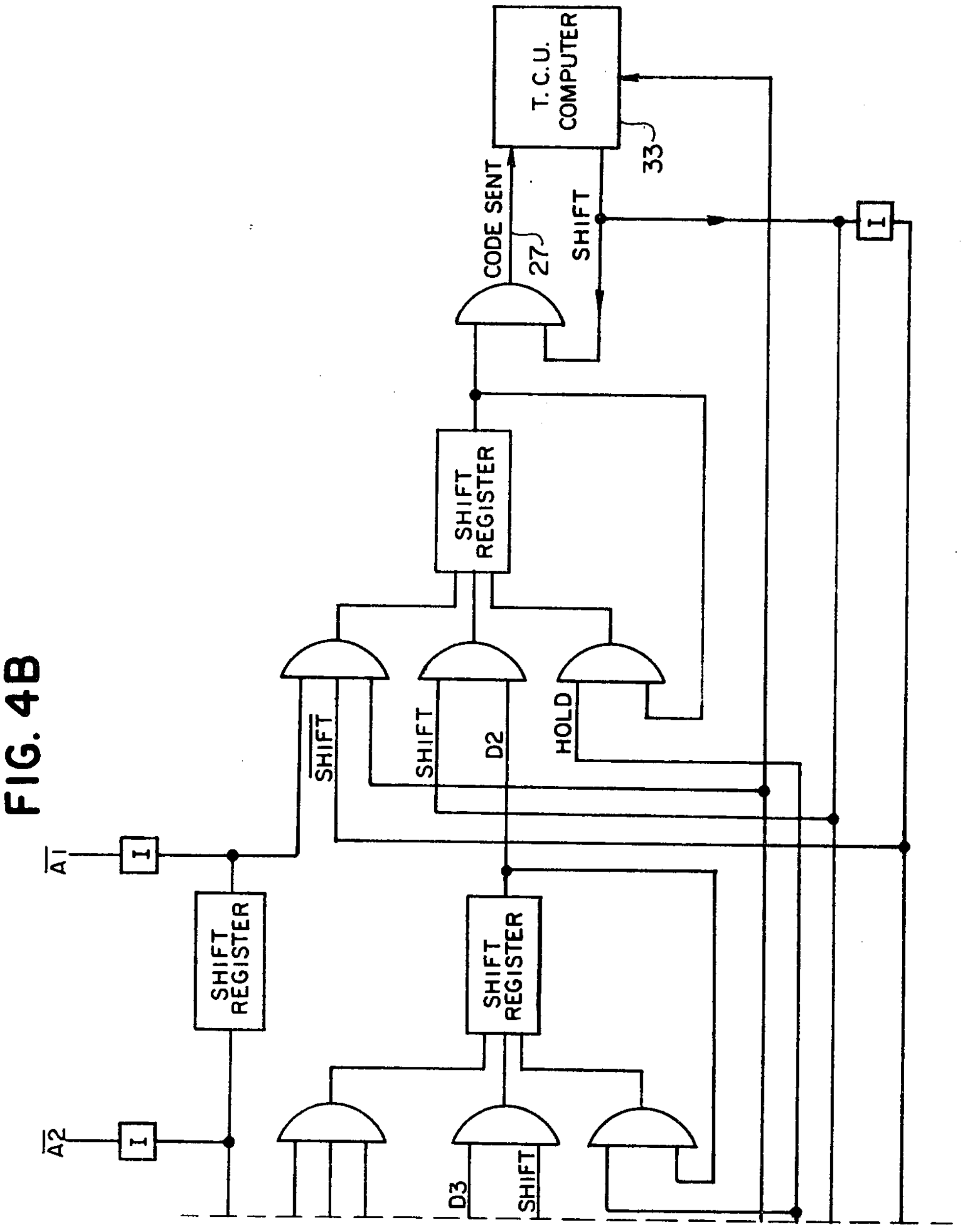

As shown in FIGS. 4A and 4B, a logic one coming from line 21 is input to the code transfer circuit 18. When this signal on line 21 is a logic one, the signal is identified as a load signal. The load signal is sent to the code transfer logic 18, which are "and" gates. The key code of the polynomial counter 16 is thereby transmitted through the code transfer logic 18 to the key code collector 22. This occurs at a clock time. Following the load signal, the compare circuit 19 returns to the logic zero state, and the contents of the key code collector 22 which represents the key code that was in the polynomial counter 16 is held for transfer to the computer 33. The transfer to the computer 33 takes place at a shift signal. The shift signal will cause the data contained in the key code collector 22 to be shifted serially to the computer 33 through the output line 27.

The key code is transferred from the key code collector 22 to the computer 33 serially. Each key code is made up of four bits. The key code is serially shifted to the computer 33 under control of the computer 33. The transfer starts at a shift signal from the computer 33 to the data collector 22. A shift signal is applied to the code transfer logic 18 as shown in FIGS. 4A and 4B, in order to prevent the entering of new key code into the key code collector 22 while the key code in the key code collector 22 is being shifted out.

The storage means shown in the full-roll keyboard circuit 30 of FIG. 1 are shift register cells. However, other binary storage devices could be substituted. Similarly, other binary devices could be substituted in the full-roll keyboard encoder circuit of FIGS. 4A and 4B without departure from the scope of the invention.

Figure 2B:
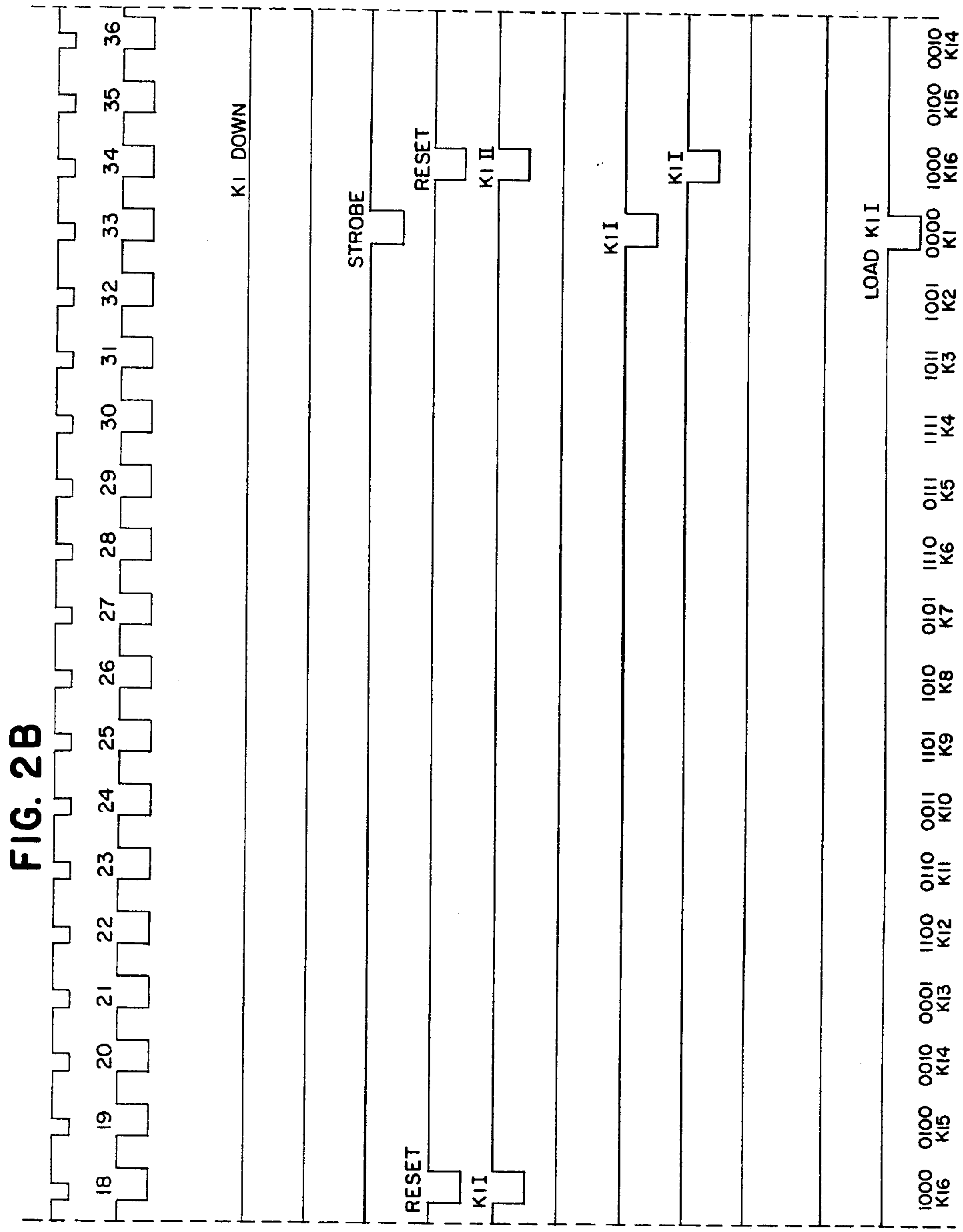
Figure 2C:
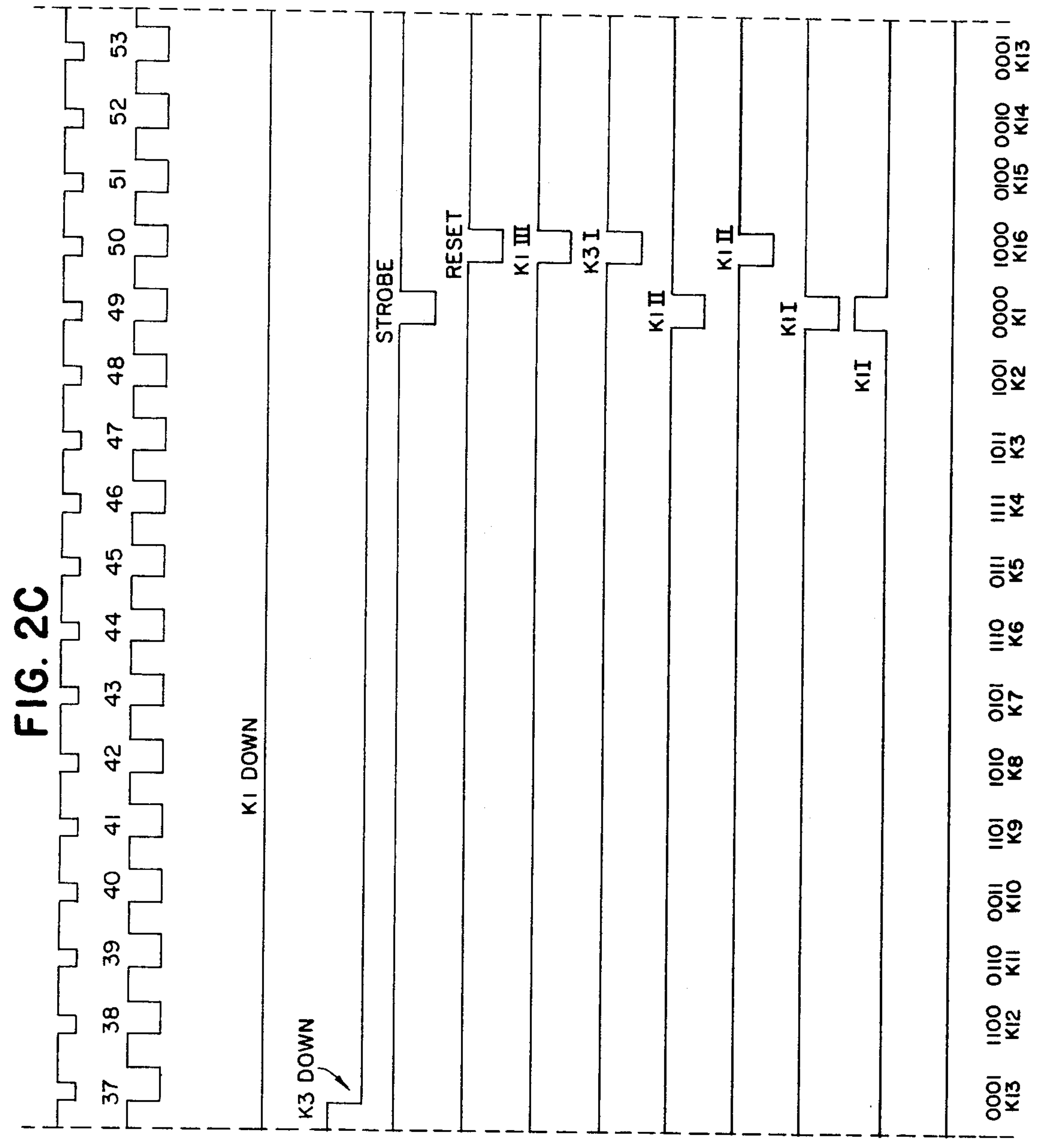

If key $K_3$ were depressed simultaneously with key $K_1$ at clock time 10, a load signal for key $K_3$ would occur at clock time 31 of FIG. 2B. The key code 1011 would be loaded into the key code collector 22 at clock time 31. An input request signal would also be sent to computer 33 at clock time 31.

At clock time 33 the load signal for key $K_1$ would be sent, as shown in FIG. 2B, to the code transfer circuit 18. The key code 0000 for key $K_1$ would replace the key code 1011 for key $K_3$ in the key code collector 22. At clock time 33, the input request signal for key $K_1$ would also go to the computer 33. Since an input request for key $K_3$ is already in computer 33 when the input request for $K_1$ comes to the computer 33, an error condition would occur. The key code for key $K_1$ would not be read by computer 33. The computer 33 would indicate that a second input request had occurred before the key code for key $K_3$ had been shifted out of the key code collector 22. The computer 33 would indicate that two keys were depressed during the same cycle time and ignore the key code in the key code collector 22. The keys $K_1$ and $K_3$ would have to again be depressed so that a second input request would not reach computer 33 before computer 33 has received the key code associated with the key code for the first key code request.

Figure 2D:
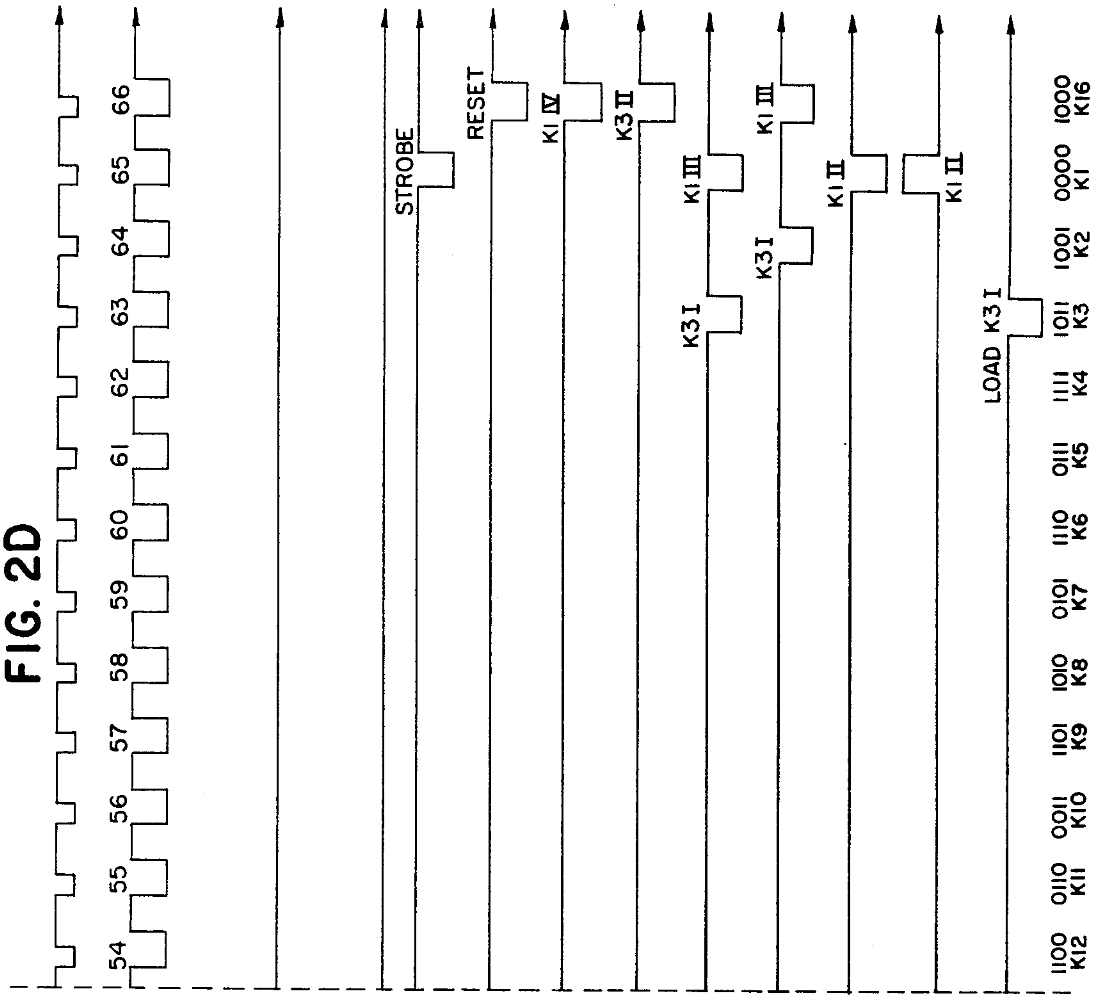

The strobe pulses of FIGS. 2A and 2D occur every 112 microseconds. It is highly improbable that an operator can physically depress two keys within 112 microseconds of one another while the operator is entering data into the keyboard. The keyboard of the present invention guards against the depression of two or more keys during the same cycle time but is activated by a roll of two or more keys which are depressed during different cycle times.

The 112 microseconds between strobes prevents an inputting of binary bits into shift register 12 due to a reed switch which is oscillating open and closed. The maximum time between bounces of a reed switch is about 40 microseconds. Therefore a second strobe will occur during the bouncing of a reed switch. After 112 microseconds, a reed switch would have stopped oscillating.

What is claimed is:

1. An unlimited roll keyboard circuit for controlling the flow of a key code of any newly depressed key to a key code data collector means during the continued depression of any other key, comprising:

a. keyboard switch means having a plurality of key means therein for sending out a binary bit from each depressed key means during each timing cycle;
b. an array of bistable means, the keyboard switch means being connected to a first section of the array of bistable means for allowing the inputting of a binary bit from each depressed key means into the first section of the array;
c. timing means for transferring the binary bits from the first section of the array of bistable means serially into a second section of the array of bistable means during a timing cycle;
d. compare means for comparing the binary bitsserially coming out of the first section of the array of bistable means with the binary bits serially coming out of the second section of the array of bistable means, during any timing cycle.

2. An unlimited roll keyboard circuit having full-roll capability for controlling the flow of a key code of any newly depressed key to a key code data collector means during the continued depression of any other key, comprising:

a. keyboard switch means having a plurality of key means therein for sending out a binary bit from each depressed key means during each timing cycle;
b. an array of shift register cells, the keyboard switch means being connected to a first section of the array of shift register cells for allowing the inputting of a binary bit from each depressed key means into a shift register cell of the first section of the array;
c. timing means for transferring the binary bits from the first section of the array of shift register cells serially into a second section of the array of shift register cells during a timing cycle;
d. compare means for comparing the binary bits serially coming out of the first section of the array of shift register cells with the binary bits serially coming out of the second section of the array of, shift register cells during any timing cycle.

3. An unlimited roll keyboard circuit for controlling the flow of a binary key code of any newly depressed key to a key code data collector means during the continued depression of any other key, comprising:

a. keyboard switch means having a plurality of key means therein for sending out a one bit from each depressed key means during each timing cycle;
b. an array of shift register cells, the keyboard switch means being connected to a first section of the array of shift register cells for allowing the inputting of a one bit from each depressed key means into a shift register cell of the first section of the array;
c. timing means for transferring the one bits from the first section of the array of shift register cells serially into a second section of the array of shift register cells during each timing cycle;

d. a logic AND gate for comparing the binary bits serially coming of of the first section of the array of shift register cells with the binary bits coming out of the second section of the array of shift register cells, during any timing cycle, the logic AND gate sending out a one bit when a one bit comes out of the first section of the array and a zero bit, which is then inverted by an inverter, comes out of the second section of the array during the serial exiting of binary bits from the first and second section of the array of shift register cells during each timing cycle, the one bit out of the logic AND gate allowing a key code to flow to the key code data collector means.

4. An unlimited roll keyboard encoder circuit for controlling the flow of information by means of any newly depressed key within the keyboard encoder circuit before any formerly depressed keys of the keyboard have been returned to their undepressed positions, comprising:

a. a strobe pulse circuit means for generating an intermediate strobe pulse at the beginning of each timing cycle;
b. a clock pulse means for generating clock pulses at and intermediately of said strobe pulses during each timing cycle;
c. a keyboard having a plurality of switches therein, each switch being connected to a different key within the keyboard for sending out a one bit from each depressed key during each timing cycle;
d. a first shift register cell array, each of whose shift register cells is connected to a different switch of the keyboard, any depressed key in the keyboard causing the loading of a one bit in its associated shift register cell, at the strobe pulse during each timing cycle;
e. a second shift register cell array having the same number of shift register cells as the first shift register array, being connected to the output of the first shift register array, the second shift register cell array serially receiving information out of the first shift register cell array at each timing cycle;
f. a compare circuit means for comparing, during each timing cycle, the binary bit out of the last cell of the first shift register cell array with the binary bit out of the last cell of the second shift register cell array allowing the compare circuit to send out a one bit when a one bit comes out of the first shift register cell array and a zero binary bit, which is then inverted by an inverter, comes out of the second shift register cell array during each timing cycle;
g. A counter means for generating a different key code at each clock pulse during each timing cycle and for generating the strobe pulses;
h. a key code data-collector means which can be encoded by the counter means at any clock pulse during each timing cycle; and
i. a code transfer means which is driven by said compare circuit means connected between the counter means and the key code data collector means for transferring a key code at any clock pulse to the key data collector means only when said one bit comes out of the compare circuit means.

5. An unlimited roll keyboard encoder circuit for controlling the flow of information by means of any newly depressed key within the keyboard encoder circuit before any formerly depressed keys of the keyboard have been returned to their undepressed positions, comprising:

a. a strobe pulse circuit means for a generating intermediate strobe pulse at the beginning of each timing cycle;
b. a clock pulse circuit for generating clock pulses intermediately of said strobe pulses during each timing cycle;
c. a keyboard having a plurality of switches therein, each switch being connected to a different key within the keyboard for sending out a one bit from each depressed key at each strobe pulse during each timing cycle;
d. a first shift register cell array, each of whose shift register cells is connected to a different switch of the keyboard, any depressed key in the keyboard causing the loading of a one bit in its associated shift register cell at the strobe pulse during each timing cycle;
e. a second shift register cell array having the same number of shift register cells as the first shift register cell array, being connected to the output of the first shift register cell array, the second shift register cell array serially receiving information out of the first shift register cell array at each timing cycle;
f. a logic AND gate for comparing, during each timing cycle, the binary bit out of the last cell of the first shift register cell array with the binary bit out of the last cell of the second shift register cell array allowing the logic AND gate to send out a one bit when a one bit comes out of the first shift register cell array and a zero bit, which is then inverted by an inverter, comes out of the second shift register cell array during each timing cycle;
g. a polynomial counter for generating a different key code at each clock pulse during each timing cycle and for generating the strobe pulses;
h. a key code data collector means which can be encoded by the polynomial counter at any clock pulse during each timing cycle; and
i. a code transfer circuit connected between the polynomial counter and the key code data collector means for transferring a key code at any clock pulse to the key code data collector means when a one bit comes out of the logic AND gate.

6. A keyboard encoder circuit for controlling the flow of information by means of any newly depressed key within the keyboard encoder circuit before any formerly depressed keys of the keyboard have been returned to their undepressed positions, comprising:

a. a strobe pulse circuit for generating an intermediate strobe pulse at the beginning of each timing cycle;
b. a clock pulse circuit for generating clock pulses intermediately of said strobe pulses during each timing cycle;
c. a reset pulse circuit for generating a reset pulse at the first clock time after every strobe pulse;
d. a keyboard having a plurality of reed switches therein, each reed switch being connected to a different key within the keyboard, for sending out a one bit from each depressed key at each strobe pulse, by means of capacitors which are charged by the reed switches and discharged by the reset pulse;
e. a first shift register cell array, each of whose shift register cells is connected to a different switch of the keyboard, any depressed key in the keyboard causing the loading of a one bit in its associated shift register cell at the strobe pulse during each timing cycle;
f. a second shift register cell array having the same number of shift register cells as the first shift register array being connected to the output of the first shift register cell array, the second shift register cell array serially receiving information out of the first shift register cell array at each timing cycle;
g. a logic AND gate for comparing, during each timing cycle, the binary bit out of the last cell of the first shift register cell array with the binary bit out of the last cell of the second shift register cell array allowing the logic AND gate to send out a one bit when a one bit comes out of the first shift register cell array and a zero bit, which is then inverted, comes out of the second shift register cell array during each timing cycle;
h. a polynomial counter for generating a different key code at each clock pulse during each timing cycle and for generating the strobe pulses;
i. a key code data collector device which can be encoded by the polynomial counter at any clock pulse during each timing cycle; and
j. a code transfer circuit connected between the polynomial counter and the key code data collector device for transferring a key code at any clock pulse to the key code data collector device when a one bit comes out of the logic AND gate.

7. An unlimited roll keyboard circuit, comprising:

a. a keyboard having a plurality of switches therein, each switch being connected to a different key within the keyboard for sending out a one bit from each depressed key during each timing cycle;

b. a first shift register, each of whose shift register cells is connected to a different switch of the keyboard, any depressed key in the keyboard causing the loading of a one bit in its associated shift register cell, at the strobe pulse during each timing cycle;

c. a second shift register having the same number of shift register cells as the first shift register array, being connected to the output of the first shift register array, the second shift register serially receiving information out of the first shift register at each timing cycle; and d. a compare circuit means for comparing, during each timing cycle the binary bit out of the last cell of the first shift register with the binary bit out of the last cell of the second shift register allowing the compare circuit to send out a one bit when a one bit comes out of the first shift register and a zero binary bit, which is then inverted by an inverter, comes out of the second shift register during each timing cycle.

* * * * *